United States Patent
Pan et al.

(10) Patent No.: US 11,526,642 B1
(45) Date of Patent: Dec. 13, 2022

(54) CLOCK NETWORK POWER ESTIMATION FOR LOGICAL DESIGNS

(71) Applicant: Synopsys, Inc., Mountain View, CA (US)

(72) Inventors: Min Pan, Fremont, CA (US); Feng Sheng, San Jose, CA (US); Anand Kumar Rajaram, Austin, TX (US)

(73) Assignee: Synopsys, Inc., Mountain View, CA (US)

(*) Notice: Subject to any disclaimer, the term of this patent is extended or adjusted under 35 U.S.C. 154(b) by 0 days.

(21) Appl. No.: 17/210,271

(22) Filed: Mar. 23, 2021

Related U.S. Application Data

(60) Provisional application No. 63/162,450, filed on Mar. 17, 2021.

(51) Int. Cl.
| | |
|---|---|
| *G06F 30/3312* | (2020.01) |
| *G06F 30/396* | (2020.01) |
| *G06F 1/10* | (2006.01) |
| *G06F 30/327* | (2020.01) |
| *G06F 30/394* | (2020.01) |

(52) U.S. Cl.
CPC ......... *G06F 30/3312* (2020.01); *G06F 1/10* (2013.01); *G06F 30/327* (2020.01); *G06F 30/394* (2020.01); *G06F 30/396* (2020.01)

(58) Field of Classification Search
USPC ........................................ 716/113
See application file for complete search history.

(56) References Cited

U.S. PATENT DOCUMENTS

| | | | | |
|---|---|---|---|---|
| 10,289,775 | B1* | 5/2019 | Wilson | G06F 30/3312 |
| 10,796,066 | B1* | 10/2020 | Farshidi | G06F 30/3312 |
| 10,860,775 | B1* | 12/2020 | Chow | G06F 30/396 |
| 2008/0216043 | A1* | 9/2008 | Hutzl | G06F 30/39 716/104 |
| 2010/0070941 | A1* | 3/2010 | Sircar | G06F 30/327 716/113 |
| 2014/0289685 | A1* | 9/2014 | Ma | G06F 30/327 716/102 |

* cited by examiner

*Primary Examiner* — Mohammed Alam
(74) *Attorney, Agent, or Firm* — Fenwick & West LLP

(57) ABSTRACT

An implementation-quality synthesis process begins with a logical design of an integrated circuit and, through a series of steps, generates a fully synthesized physical design of the integrated circuit. One of the steps is clock synthesis, which generates the clock network for the integrated circuit. In certain embodiments, a method includes the following steps. A reduced clock synthesis process is applied, rather than the implementation-quality clock synthesis process. This generates a clock network for the logical design, which will be referred to as a proxy clock network because it is used as a proxy to estimate power consumption of the fully synthesized clock network. Because the reduced clock synthesis process runs much faster than the implementation-quality clock synthesis process, the front end designer may use these power estimates in the front end design process, including to explore different design variations in the logical design.

8 Claims, 9 Drawing Sheets

CLOCK NETWORK POWER ESTIMATION FOR LOGICAL DESIGNS

CROSS REFERENCE TO RELATED APPLICATION(S)

This application claims priority under 35 U.S.C. § 119(e) to U.S. Provisional Patent Application Ser. No. 63/162,450, "Clock Network Power Estimation for Logical Designs," filed Mar. 17, 2021. The subject matter of all of the foregoing is incorporated herein by reference in their entirety.

TECHNICAL FIELD

The present disclosure relates to the design of integrated circuits and more specifically to clock network power estimation for logical designs.

BACKGROUND

Designing a very large scale integrated (VLSI) circuit is a complex process. At a high level the design process is divided into two parts: the front end or logical design and the back end or physical design. These two parts are typically performed by different people. The front end designer develops the logical design using a hardware description language (HDL) description of the design. The front end designer uses the HDL to develop a register transfer level (RTL) description for the design. The RTL is synthesized into a gate level netlist.

The back end designer takes the gate level netlist and works on the physical aspects of the design implementation, including floorplanning, placement, and routing. A floorplanned design includes a core boundary, input/output pads, placement of cells and global routing result. The fully implemented physical design includes optimization of the physical design and high quality placement of cells and detailed routing.

SUMMARY

The full design process, which will be referred to as an implementation-quality synthesis process, begins with a logical design of an integrated circuit and, through a series of steps, generates a fully synthesized physical design of the integrated circuit. One of the steps is clock synthesis, which generates the clock network for the integrated circuit. In certain embodiments, a method includes the following steps. A reduced clock synthesis process is applied, rather than the implementation-quality clock synthesis process. This generates a clock network for the logical design, which will be referred to as a proxy clock network because it is used as a proxy to estimate power consumption of the fully synthesized clock network. Because the reduced clock synthesis process runs much faster than the implementation-quality clock synthesis process, the front end designer may use these power estimates in the front end design process, including to explore different design variations in the logical design.

Other aspects include components, devices, systems, improvements, methods, processes, applications, computer readable mediums, and other technologies related to any of the above.

BRIEF DESCRIPTION OF THE DRAWINGS

The disclosure will be understood more fully from the detailed description given below and from the accompanying figures of embodiments of the disclosure. The figures are used to provide knowledge and understanding of embodiments of the disclosure and do not limit the scope of the disclosure to these specific embodiments. Furthermore, the figures are not necessarily drawn to scale.

DETAILED DESCRIPTION

Figure 1:
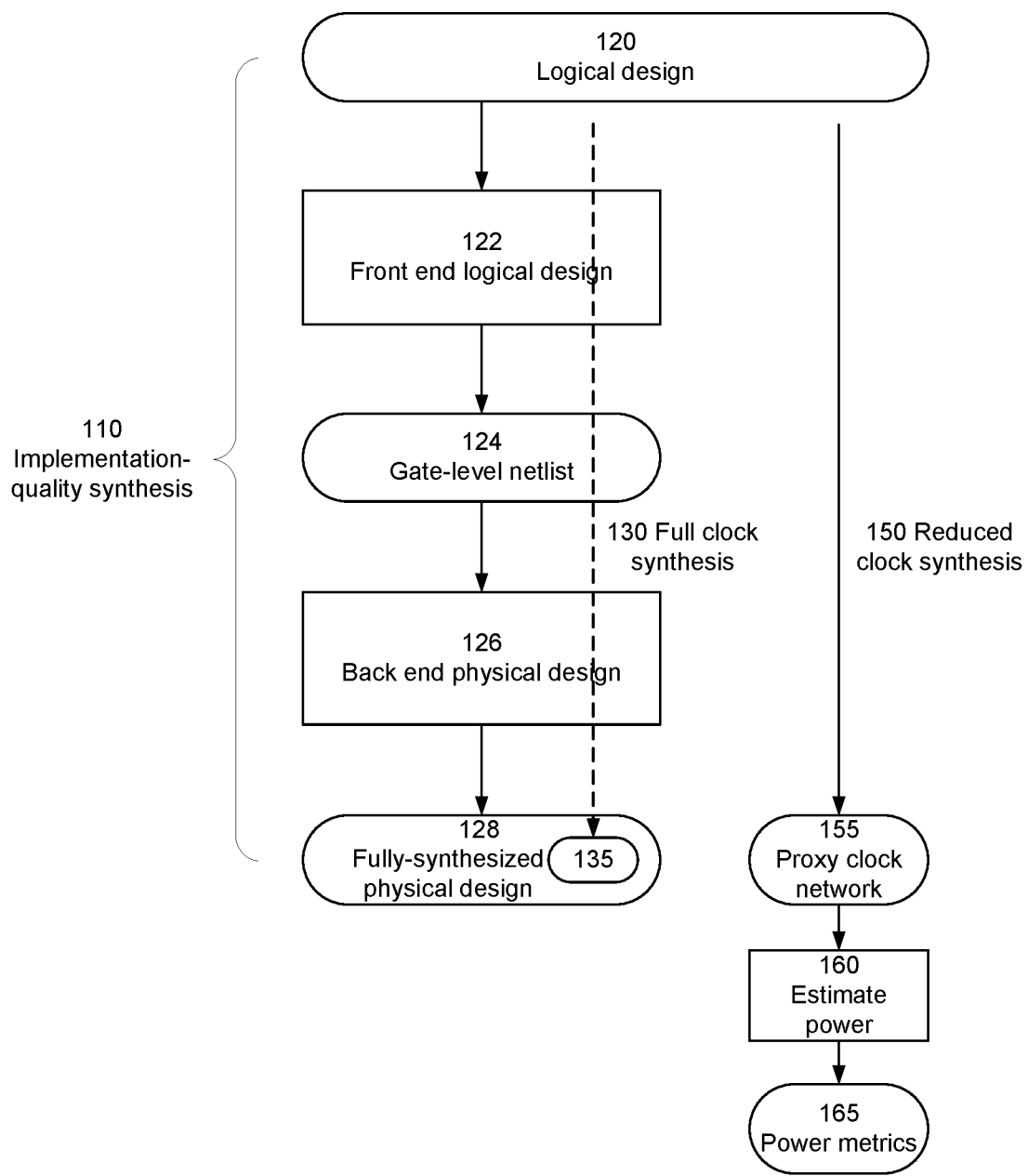
FIG. 1 is a flowchart for estimating power behavior of a logical design.

Aspects of the present disclosure relate to clock network power estimation for logical designs. Power behavior and consumption is an important attribute of any integrated circuit. Within an integrated circuit, a clock network is used to distribute a clock signal from a clock source to many different clock sinks within the circuit. The clock network is an important contributor to overall power consumption.

However, the power behavior of the clock network depends on its physical implementation. The topology of the clock network and the number and placement of cells in the clock network affect the power behavior, but these are not known until the physical design stage. On the other hand, changes in the logical design can have significant downstream effects on the clock network, its physical design and its power behavior. It would be useful if the effects of changes in the logical design on the power behavior of the clock network could be estimated without having to complete the full implementation-quality synthesis process from logical design to physical design. This is especially true during the exploration phase when the front end designer may want to quickly consider a number of different logical design variations. It is typically not feasible to perform the full implementation-quality synthesis process on each possible variation being considered. However, it would be useful to be able to estimate power behavior for the different variations and to compare their relative behaviors.

In one aspect, a reduced clock synthesis process is applied to a logical design of an integrated circuit, thus producing a clock network in much less time than the implementation-quality clock synthesis process. This clock network may not be good enough for the final implementation of the integrated circuit, but it is good enough to serve as a proxy to estimate power behavior of the fully synthesized clock network that would result from the implementation-quality clock synthesis process.

Any synthesis process operates to meet constraints on the design. The implementation-quality clock synthesis process is subject to a complete set of design constraints on the clock network. In one approach, the reduced clock synthesis process does not address all of these design constraints, but instead operates to meet a reduced set of the design constraints. For example, the reduced set of design constraints may include constraints on max-transition, max-capacitance, max-fanout, non-default rules and layer assignment, relaxed constraints on clock skew, and largely ignores optimizing for clock latency and buffer count. In this way, the resulting proxy clock network will have a similar power behavior to the fully synthesized clock network, but produced by a synthesis process that avoids or reduces compute-intense operations that largely do not affect power consumption. In addition, for purposes of comparing different logical designs, some inaccuracy in the power estimates may be tolerated so long as the relative power consumptions can be predicted.

Having the ability to estimate power behavior for logical designs is advantageous in many respects. It allows the front end designer to explore different logical designs with respect to power behavior. This can produce better quality designs and reduce the overall design cycle. To achieve this, the use of a reduced synthesis process reduces the amount of compute resources required compared to the full implementation-quality synthesis process.

FIG. 1 is a flowchart for estimating power behavior of a logical design. The left-hand flow 110 is an implementation-quality synthesis flow. It starts with a logical design 120, such as an HDL (hardware description language) description of the behavior or an RTL (register transfer level) design which describes the behavior using logic gates. The logical design primarily describes the functioning of the integrated circuit, but without much information about how these functions will be physically implemented. The front end design process 122 is applied to the logical design to generate a gate-level netlist 124. A back end design process 126 is applied to the gate-level netlist to generate the fully-synthesized physical design 128. The fully-synthesized physical design identifies the specific cells used in the physical integrated circuit, where those cells are physically placed on the integrated circuit and how electrical connections between cells are physically routed on the integrated circuit. Cells are predesigned circuits that form the building blocks of the physical design. This flow 110, and substeps within the flow, are repeated many times as the circuit design is iteratively improved. This design process is described in more detail in FIG. 9 below.

At a high level, the integrated circuit can be divided into a signal network that includes the memories, functional circuits and interconnects (nets) that connect them; a power network for power distribution; and a clock network 135 for clock distribution. The clock network may have different architectures, such as a tree or mesh structure. The portion of the synthesis flow 110 related to generating the clock network will be referred to as clock synthesis 130.

The righthand flow 150 is a reduced clock synthesis process. It also produces a clock network 155 corresponding to the logical design 120. However, the reduced clock synthesis process 150 is not as rigorous as the implementation-quality clock synthesis process 130. For example, the reduced process 150 may skip certain steps or design constraints or address them in a more relaxed manner than the implementation-quality version 130. As a result, the reduced flow 150 runs much faster than the full flow 130. However, the reduced flow 150 retains the parts of the implementation-quality flow 130 that affect power behavior. The resulting clock network 155 will then have a similar power behavior as the fully-synthesized clock network 135 and may be used as a proxy for clock network 135 for purposes of power estimation. Accordingly, clock network 155 is referred to as the proxy clock network 155. Power estimation techniques 160 may be used to estimate various power metrics 165 based on the proxy clock network 155. Examples of power metrics include leakage power, switching power, internal power and total power. Metrics may measure average consumption, peak consumption or other quantities.

Note that the proxy clock network 155 may differ from the fully-synthesized clock network 135 in many ways. For example, the clock network 155 may not be a complete physical design. In the examples below, the proxy clock network 155 contains cells that have been physically placed but that have not been physically routed, because that is sufficient for power estimation. It may also have a different topology. For example, if the clock network is a tree, the two clock networks 135, 155 may have branching at different locations. The number of clock repeaters, their sizes and locations may also be different.

The approach shown in FIG. 1 provides for fast power estimation for the clock network in an integrated circuit. Analogous reduced synthesis approaches may be applied to other aspects of the integrated circuit to provide fast estimates of power, performance (timing), area or other metrics for a logical design. This allows the front end designer to explore different logical designs. The designer may use these fast estimates to identify problem areas within a design and address them in the logical design phase. Alternatively, the designer may make changes to a logical design and use the fast estimates to understand the impact of the changes on the metrics.

Figure 2:
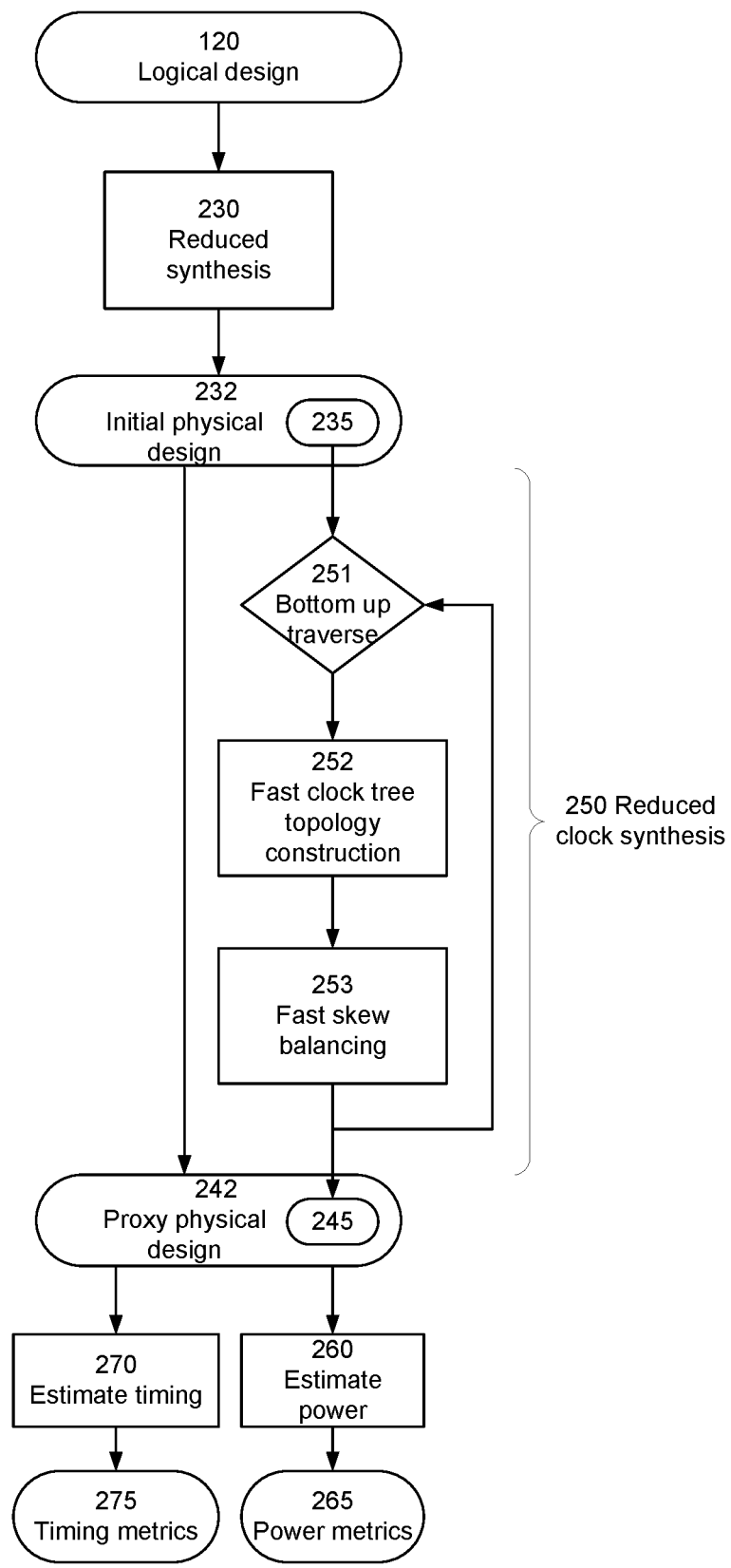
FIG. 2 is a flowchart for estimating timing and power of a logical design.

FIG. 2 is a flowchart for estimating timing and power of a logical design. A reduced synthesis process 230 is applied to the logical design 120 to generate a physical design 232 that includes both the signal networks within the integrated circuit, as well as the clock network 235. The synthesis process 230 is reduced in a manner that reduces run time but still provides relatively accurate timing information for the signal networks. Some embodiments of a reduced synthesis process may perform a subset of operations performed by an implementation-quality full synthesis. The reduced synthesis process may skip certain operations that are performed by the implementation-quality full synthesis. Furthermore, the reduced synthesis process may perform a single pass for several operations compared to the implementation-quality full synthesis which performs multiple passes. Furthermore, the reduced synthesis process may perform fewer iterations of each pass compared to corresponding operations performed by the implementation-quality full synthesis process. As a result, the reduced synthesis process generates a suboptimal netlist, for example, a netlist that would return more pessimistic delays if calculated using standard techniques for determining delays. Embodiments may use various techniques to correct for this. Accordingly, the reduced synthesis process achieves high accuracy area, power, and timing correlation compared to the implementation-quality full synthesis process but with faster runtime.

A reduced clock synthesis process 250 is applied to the clock network 235 from the design produced by the reduced synthesis process 230, resulting in a proxy clock network 245. The rest of the physical design 232 may also change, resulting in physical design 242. This design 242 is used to estimate 270 timing behavior of the signal network, as measured by various timing metrics 275. The proxy design 242 may also be used to estimate 260 various power metrics 265, both for the proxy clock network 245 and for the rest of the integrated circuit. Other metrics may also be estimated, for example other measures of power, performance (including timing) and area.

The estimate of timing metrics for proxy design 242 may be based on ideal clocking rather than propagated clocking, even though a clock network 245 has been synthesized and propagated clocking could be calculated based on clock network 245. Ideal clocking is based on ideal assumptions about when the clock signal arrives at each of the sinks in the clock network. For example, it may be assumed that all clock signals have a latency of 0.1 ns from the clock source to clock sink regardless of the location of the clock sink. Timing on the signal network, for example set-up and hold violations, is then calculated using this ideal timing of the clock signals.

Once a clock network 245 is synthesized, the timing calculations may be based on the actual latency from clock source to each clock sink. Clock signals may arrive earlier or later to different clock sinks, resulting in skew. This is propagated clocking. Timing based on propagated clocking is usually considered to be more accurate in the sense that it accounts for delays within the clock network. However, in this case, the proxy clock network 245 is not the clock network that will be implemented in the integrated circuit design. It is a clock network constructed primarily to estimate power and it may be significantly different from the fully-synthesized clock network. For example, it may have a different topology or tree structure. Thus, it may be more useful to use ideal clocking, even though propagated clocking is available (but for the wrong clock network). This is compounded if the timing metrics are used to compare different logics designs. A timing comparison based on propagated clocking for the wrong clock network in one logic design and propagated clocking also using the wrong clock network in another logic design just increases the possible sources of error.

Figure 3:
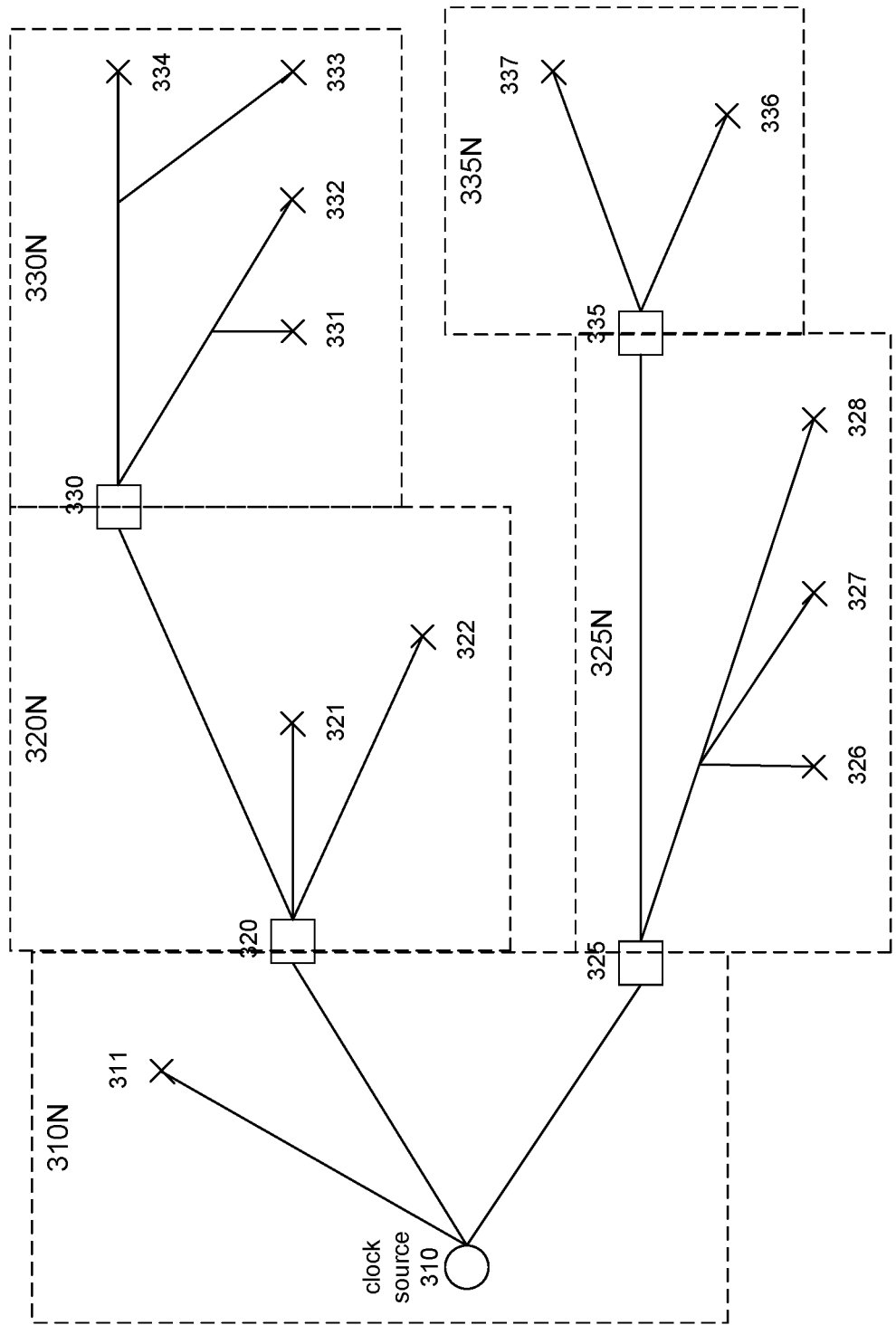
FIG. 3 shows a clock tree.

FIG. 2 also shows a specific example of a reduced clock synthesis process 250 for a clock tree. Other reduced processes may also be used. The example process 250 is explained using FIGS. 3-6. FIG. 3 shows a clock tree. The round symbol is the clock source or clock root 310, for example a clock port or an oscillator. The X's are the clock sinks, which are the leaves of the tree. They may be registers or flops, for example. The squares are clock gates, which are intermediate gates in the clock tree. The lines are the interconnects (nets) between different elements. These nets may contain repeaters, such as buffers and inverters. Repeaters are not shown in the figure, but note that branching may indicated shared repeaters. For example, clock gate 330 drives clock sinks 331 and 332. Repeaters on the net from clock gate 330 before the branch will be driving both clock sinks 331 and 332. In the following example, the clock source, clock gates and clock sinks are placed. Repeaters are also placed, but the nets are not yet physically routed.

The clock tree may be divided into gate-level nets, where each gate-level net has a clock source or clock gate as the driver, and includes all of the clock gates and clock sinks directly connected to that driver and intervening repeaters. The clock tree shown has five gate-level nets labeled 310N, 320N, 325N, 330N and 335N. Gate-level net 310N has clock source 310 as its driver and includes 311, 320 and 325 as its local sinks. Gate-level net 320N has clock gate 320 as its driver and includes 321, 322 and 330 as its local sinks. And so on. The gate-level nets are organized in levels. Gate-level net 310N is the top level, gate-level nets 320N and 325N are the second level, and gate-level nets 330N and 335N are the bottom level.

Returning to FIG. 2, the reduced clock flow 250 shown traverses 251 the clock tree from the bottom up. Thus, it starts with the gate-level nets at the bottom level (nets 330N and 335N in FIG. 3), then moves to the next level (nets 320N and 325N) and so on until it reaches the top level (net 310N). For each gate-level net, the reduced synthesis includes two steps: fast clock tree topology construction 252 followed by fast skew balancing 253. These are shown in more detail in FIGS. 4-7.

Before moving to the details of these two steps, the clock synthesis flow 250 is reduced in the following ways. An implementation-quality clock synthesis operates to meet a complete set of design constraints that typically includes the following:

Max-transition. The transition time for the clock signals do not exceed some maximum.

Max-capacitance. The total capacitance of the net driven by any element (e.g., repeaters and clock gates) does not exceed some maximum.

Max-fanout. The fanout from any element does not exceed some maximum.

NDR (non-default rules)/layer assignment constraints. For example, there may be special rules like "double width and double spacing" for the spacing of clock nets or that specify which layers clock nets are routed on.

Clock skew. Clock skew is the difference in latency to different clock sinks. These are constraints on clock skews. For example, global clock skew (clock skew between any two clock sinks) does not exceed some maximum.

Optimize clock latency. Latency is the propagation time from the clock source to a clock sink. Reducing clock latency is an optimization goal.

Optimize buffer count. Reducing the number of repeaters is an optimization goal.

The reduced clock synthesis flow 250 does not try to meet all of these constraints. Rather, it operates to meet a reduced set of the design constraints. The topology construction 252 operates to meet the first three constraints—max-transition, max-capacitance and max-fanout—and also NDR (non-default rules)/layer assignment constraints. In some cases, these constraints may be relaxed some rather than meeting them as strictly as in the implementation-quality clock synthesis. The fast skew balancing 253 operates to meet a significantly relaxed version of clock skew constraints. The clock latency and buffer count optimizations are largely not considered by the reduced synthesis flow 250 (although there might be some), because they are computationally expensive and do not have as large an effect on power behavior.

In addition, the reduced clock synthesis flow 250 considers fewer types of optimizations compared to an implementation-quality flow. In this example, the reduced flow 250 operates primarily by adding repeaters and deemphasizes other types of modifications or optimizations that are more computationally expensive. For example, an implementation-quality flow may spend more time on sizing cells for area and power optimization, cloning cells, extensive buffering optimization, relocations to reduce latency, skew optimization for timing and routing layer optimization.

Figure 4:
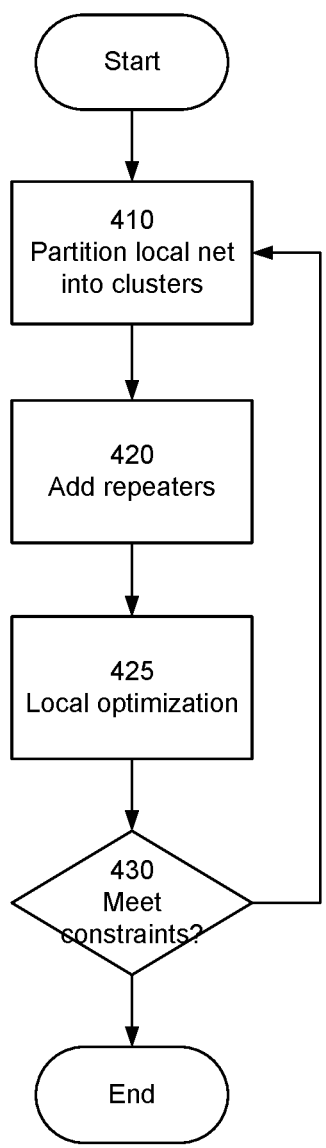
FIG. 4 is a flowchart for fast clock tree topology construction.

FIG. 4 is a flowchart for fast clock tree topology construction. This step addresses violations of max-transition, max-capacitance, max-fanout and NDR (non-default rules)/layer assignment constraints by adding repeaters into the clock tree. From FIG. 2, this step is applied one gate-level net at a time, starting from the bottom of the tree and traversing up to the top. For each gate-level net, if none of the above constraints are violated, then this step can be skipped. Otherwise, the gate-level net is partitioned 410 into smaller clusters of elements and repeaters are added 420 to drive each cluster. When the repeaters are added, some local optimization 425 may also be performed, such as adjusting the size or placement of the downstream or upstream elements. This can be done from the bottom up and repeated 430 until the constraints are met.

Figure 5C:
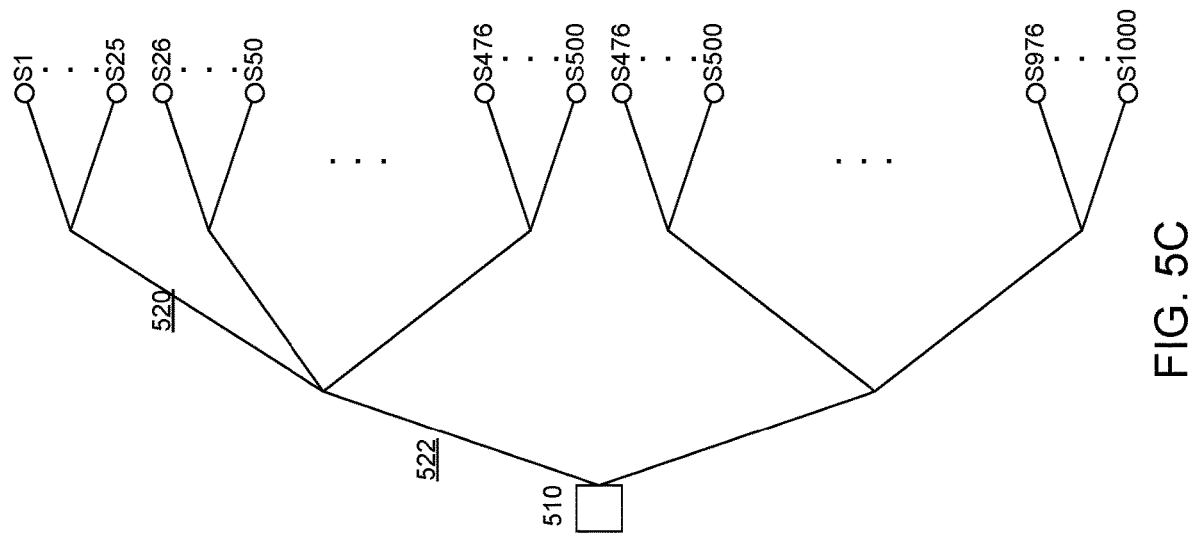
FIGS. 5A-5C show an example of fast clock tree topology construction.
Figure 5B:
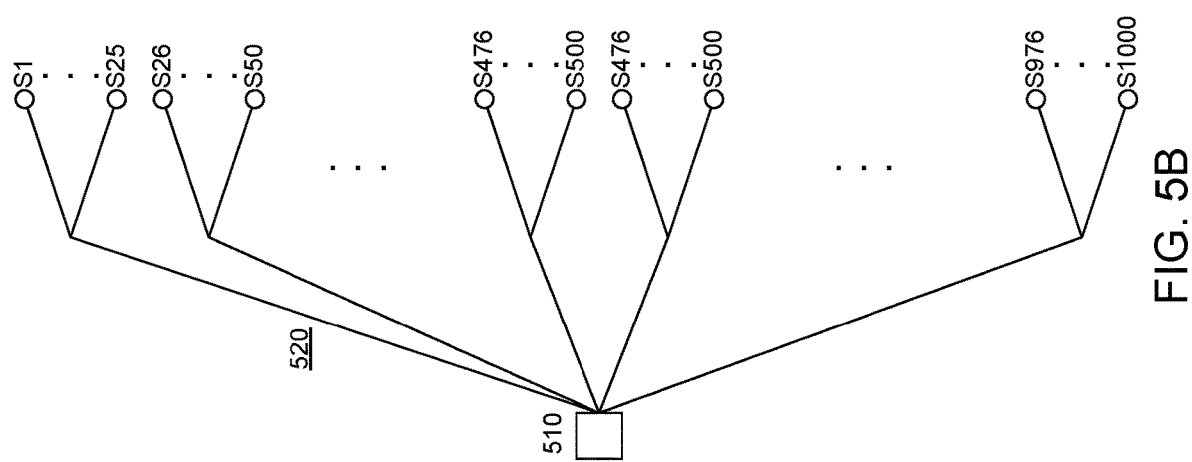
Figure 5A:
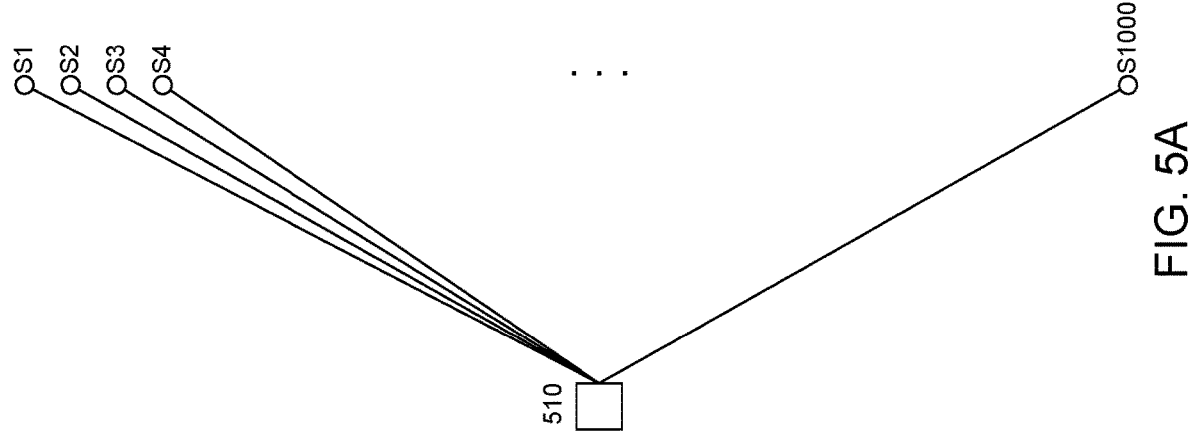

For example, consider a situation where the root driver 510 of the gate-level net is used to directly drive 1000 local sinks S1-S1000, as shown in FIG. 5A. Assume that the max-fanout constraint requires that the fanout is limited to 25. This gate-level net violates the max-fanout constraint. The gate-level net is partitioned into clusters of 25 local sinks each, as shown in FIG. 5B. Repeaters are added to the nets 520 coming directly from root driver 510 to drive each cluster. This gate-level net still violates the max-fanout constraint, because the root driver 510 still has a fanout of 40. So this process is repeated. The fanout of 40 is partitioned into two clusters of 20 each and repeaters are added to the new nets 522, as shown in FIG. 5C. Now the gate-level net meets the max-fanout constraint. In implementation-quality synthesis, a significant amount of resizing and reclustering may be performed to further optimize the clock tree by improving clock latency, skew, area and/or buffer count. In the reduced synthesis flow, these optimizations are largely not performed because they are computationally expensive and do not significantly increase the accuracy of the power estimate.

Figure 6:
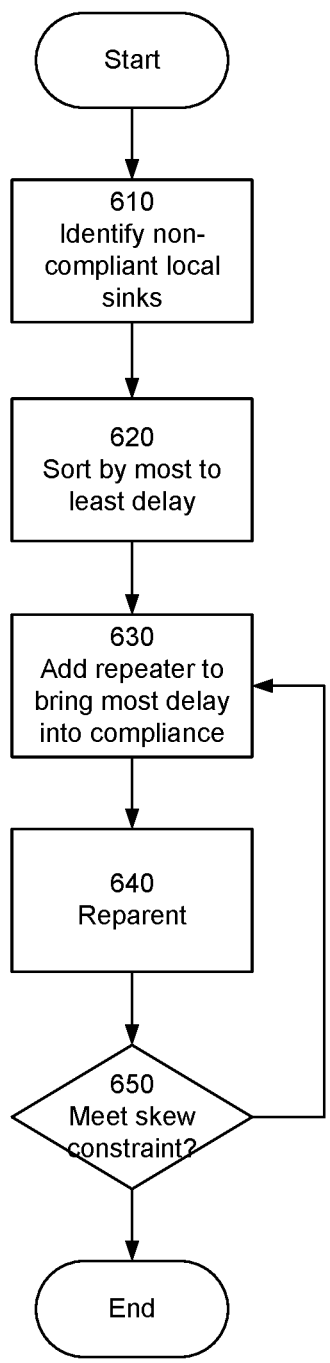
FIG. 6 is a flowchart for fast skew balancing.

FIG. 6 is a flowchart for fast skew balancing. In the example of FIG. 2, fast skew balancing is also applied one gate-level net at a time after the clock tree topology construction is completed. That is, clock skew is balanced within each gate-level net, but not across gate-level nets. Even within each gate-level net, clock skew is balanced to the extent necessary to achieve sufficiently accurate power estimates. There is no need to balance clock skews to meet timing constraints because the proxy clock tree is not the fully-synthesized clock tree that will be used in the final design.

Clock skew within a gate-level net is the difference in delay from the driver of the gate-level net to each of the local sinks for the gate-level net. The approach of FIG. 6 adds repeaters until the maximum clock skew is reduced to an acceptable level, where acceptable means good enough to produce sufficiently accurate power estimates. Let $\Delta$ be the propagation delay through a "standard" repeater. Let $N\Delta$ be the maximum acceptable gate-level clock skew. N may be user selected. Alternatively, it may be empirically determined. If the gate-level net has a maximum delay of D to one of the local sinks, then the gate-level net will meet this relaxed clock skew constraint if delays to all local sinks fall within the range $[D-N\Delta, D]$. If not, then repeaters are added along the paths that are too fast until their delay falls within the acceptable range. The approach shown in FIG. 6 does this while reducing the total number of repeaters added.

For each gate-level net, if the relaxed clock skew constraints is met, then this skew balancing step can be skipped. Otherwise, the local sinks that are too fast are identified 610 and sorted 620 from most delay to least delay. The local sink with the most delay is closest to meeting the skew constraint and is addressed first. A repeater is added 630 to bring that local sink into compliance. The nets for the non-compliant local sinks are reparented 640 to the output of the added repeater. Delays are recalculated and the process is repeated 650 until the skew constraint is met.

Figure 7C:
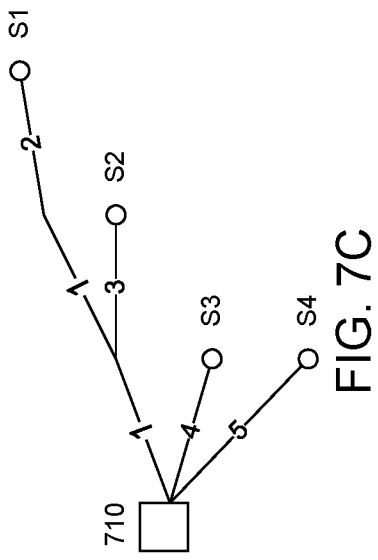
FIGS. 7A-7C show an example of fast skew balancing.
Figure 7B:
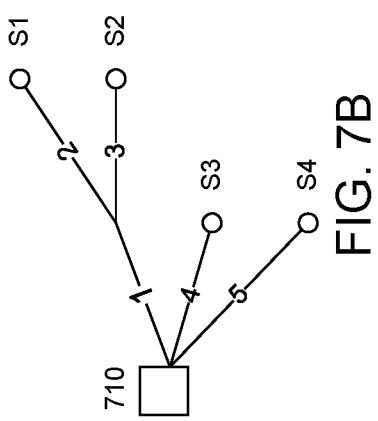
Figure 7A:
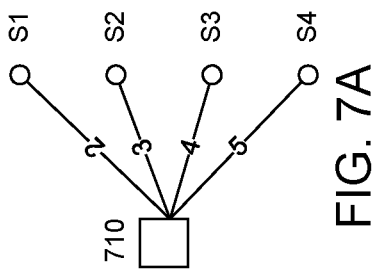

FIGS. 7A-7C show an example. In FIG. 7A, the root driver 710 of the gate-level net drives four local sinks S1-S4 with no overlap in any of the nets. The numbers above each net indicate the propagation delay along the net in units of $\Delta$, primarily due to repeaters on that net. N=1 in this example. Sink S1 has the shortest delay of $2\Delta$ and sink S4 has the longest delay of $5\Delta$. Since N=1, the range of acceptable delays is $[4\Delta, 5\Delta]$. Sinks S3 and S4 are already in compliance. Sink S2 has the longest non-compliant delay at $3\Delta$. A repeater with delay $1\Delta$ is added to the clock tree to bring sink S2 into compliance, and non-compliant sinks S1 and S2 are reparented to the output of this repeater as shown in FIG. 7B. Sink S2 is now compliant, but S1 still is not. The process is repeated for only S1, adding another repeater with delay $1\Delta$ and reparenting S1 to the output of this repeater, as shown in FIG. 7C.

Based on experiments run on actual circuit designs, the approach described above was able to estimate power consumption with an average error of less than 3%, reliably with an error of less than 10% or even less than 5%, and best cases with an error of less than 1%. At the same time, it ran approximately 3× to 4× faster.

Figure 8:
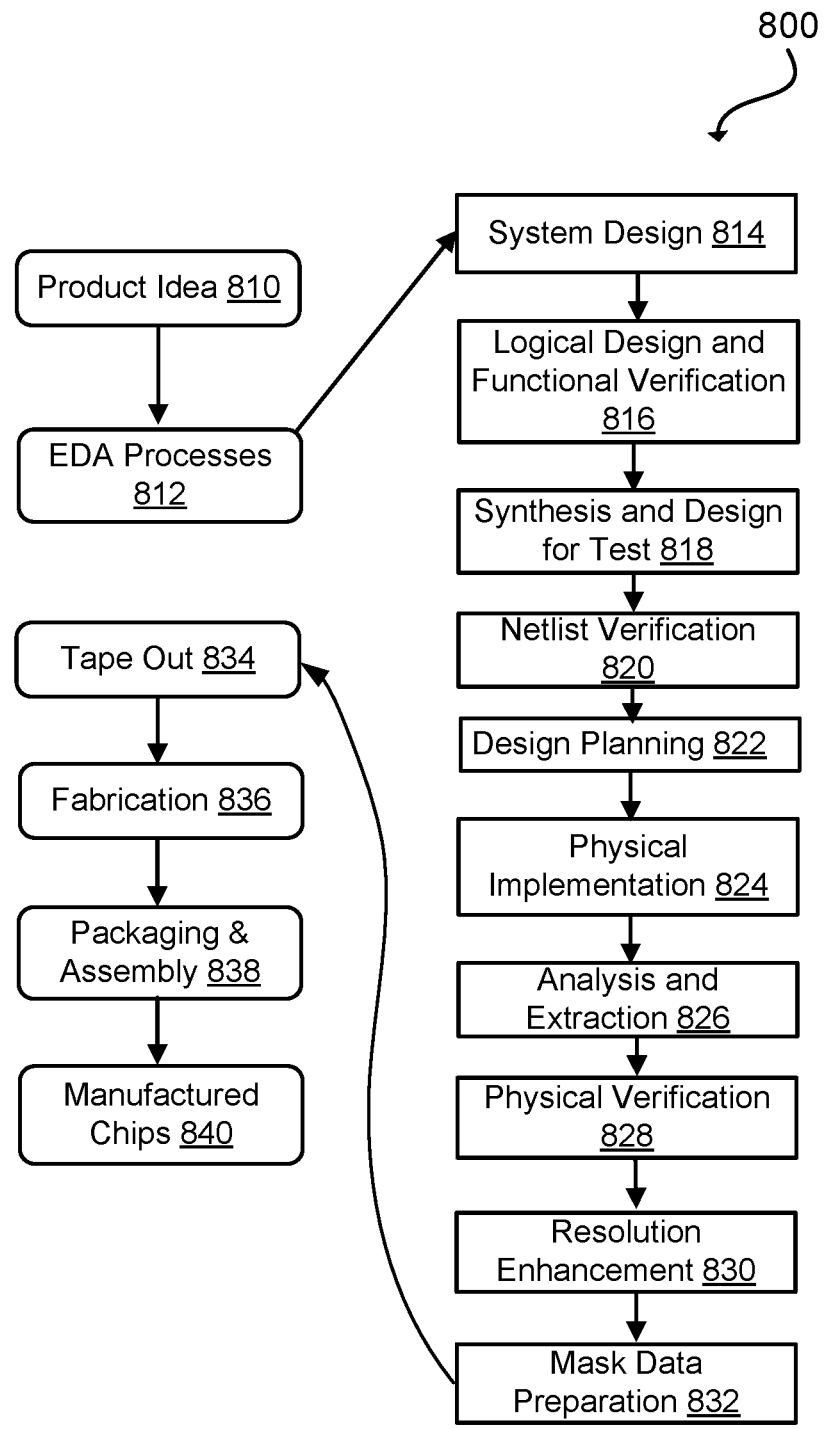
FIG. 8 depicts a flowchart of various processes used during the design and manufacture of an integrated circuit in accordance with some embodiments of the present disclosure.

FIG. 8 illustrates an example set of processes 800 used during the design, verification, and fabrication of an article of manufacture such as an integrated circuit to transform and verify design data and instructions that represent the integrated circuit. Each of these processes can be structured and enabled as multiple modules or operations. The term 'EDA' signifies the term 'Electronic Design Automation.' These processes start with the creation of a product idea 810 with information supplied by a designer, information which is transformed to create an article of manufacture that uses a set of EDA processes 812. When the design is finalized, the design is taped-out 834, which is when artwork (e.g., geometric patterns) for the integrated circuit is sent to a fabrication facility to manufacture the mask set, which is then used to manufacture the integrated circuit. After tape-out, a semiconductor die is fabricated 836 and packaging and assembly processes 838 are performed to produce the finished integrated circuit 840.

Specifications for a circuit or electronic structure may range from low-level transistor material layouts to high-level description languages. A high-level of abstraction may be used to design circuits and systems, using a hardware description language ('HDL') such as VHDL, Verilog, SystemVerilog, SystemC, MyHDL or OpenVera. The HDL description can be transformed to a logic-level register transfer level ('RTL') description, a gate-level description, a layout-level description, or a mask-level description. Each lower abstraction level that is a less abstract description adds more useful detail into the design description, for example, more details for the modules that include the description. The lower levels of abstraction that are less abstract descriptions can be generated by a computer, derived from a design library, or created by another design automation process. An example of a specification language at a lower level of abstraction language for specifying more detailed descriptions is SPICE, which is used for detailed descriptions of circuits with many analog components. Descriptions at each level of abstraction are enabled for use by the corresponding tools of that layer (e.g., a formal verification tool). A design process may use a sequence depicted in FIG. 8. The processes described by be enabled by EDA products (or tools).

During system design 814, functionality of an integrated circuit to be manufactured is specified. The design may be optimized for desired characteristics such as power consumption, performance, area (physical and/or lines of code), and reduction of costs, etc. Partitioning of the design into different types of modules or components can occur at this stage.

During logic design and functional verification 816, modules or components in the circuit are specified in one or more description languages and the specification is checked for functional accuracy. For example, the components of the circuit may be verified to generate outputs that match the requirements of the specification of the circuit or system being designed. Functional verification may use simulators and other programs such as testbench generators, static HDL checkers, and formal verifiers. In some embodiments, special systems of components referred to as 'emulators' or 'prototyping systems' are used to speed up the functional verification.

During synthesis and design for test 818, HDL code is transformed to a netlist. In some embodiments, a netlist may be a graph structure where edges of the graph structure represent components of a circuit and where the nodes of the graph structure represent how the components are interconnected. Both the HDL code and the netlist are hierarchical articles of manufacture that can be used by an EDA product to verify that the integrated circuit, when manufactured, performs according to the specified design. The netlist can be optimized for a target semiconductor manufacturing technology. Additionally, the finished integrated circuit may be tested to verify that the integrated circuit satisfies the requirements of the specification.

During netlist verification 820, the netlist is checked for compliance with timing constraints and for correspondence with the HDL code. During design planning 822, an overall floor plan for the integrated circuit is constructed and analyzed for timing and top-level routing.

During layout or physical implementation 824, physical placement (positioning of circuit components such as transistors or capacitors) and routing (connection of the circuit components by multiple conductors) occurs, and the selection of cells from a library to enable specific logic functions can be performed. As used herein, the term 'cell' may specify a set of transistors, other components, and interconnections that provides a Boolean logic function (e.g., AND, OR, NOT, XOR) or a storage function (such as a flipflop or latch). As used herein, a circuit 'block' may refer to two or more cells. Both a cell and a circuit block can be referred to as a module or component and are enabled as both physical structures and in simulations. Parameters are specified for selected cells (based on 'standard cells') such as size and made accessible in a database for use by EDA products.

During analysis and extraction 826, the circuit function is verified at the layout level, which permits refinement of the layout design. During physical verification 828, the layout design is checked to ensure that manufacturing constraints are correct, such as DRC constraints, electrical constraints, lithographic constraints, and that circuitry function matches the HDL design specification. During resolution enhancement 830, the geometry of the layout is transformed to improve how the circuit design is manufactured.

During tape-out, data is created to be used (after lithographic enhancements are applied if appropriate) for production of lithography masks. During mask data preparation 832, the 'tape-out' data is used to produce lithography masks that are used to produce finished integrated circuits.

A storage subsystem of a computer system (such as computer system 900 of FIG. 9) may be used to store the programs and data structures that are used by some or all of the EDA products described herein, and products used for development of cells for the library and for physical and logical design that use the library.

Figure 9:
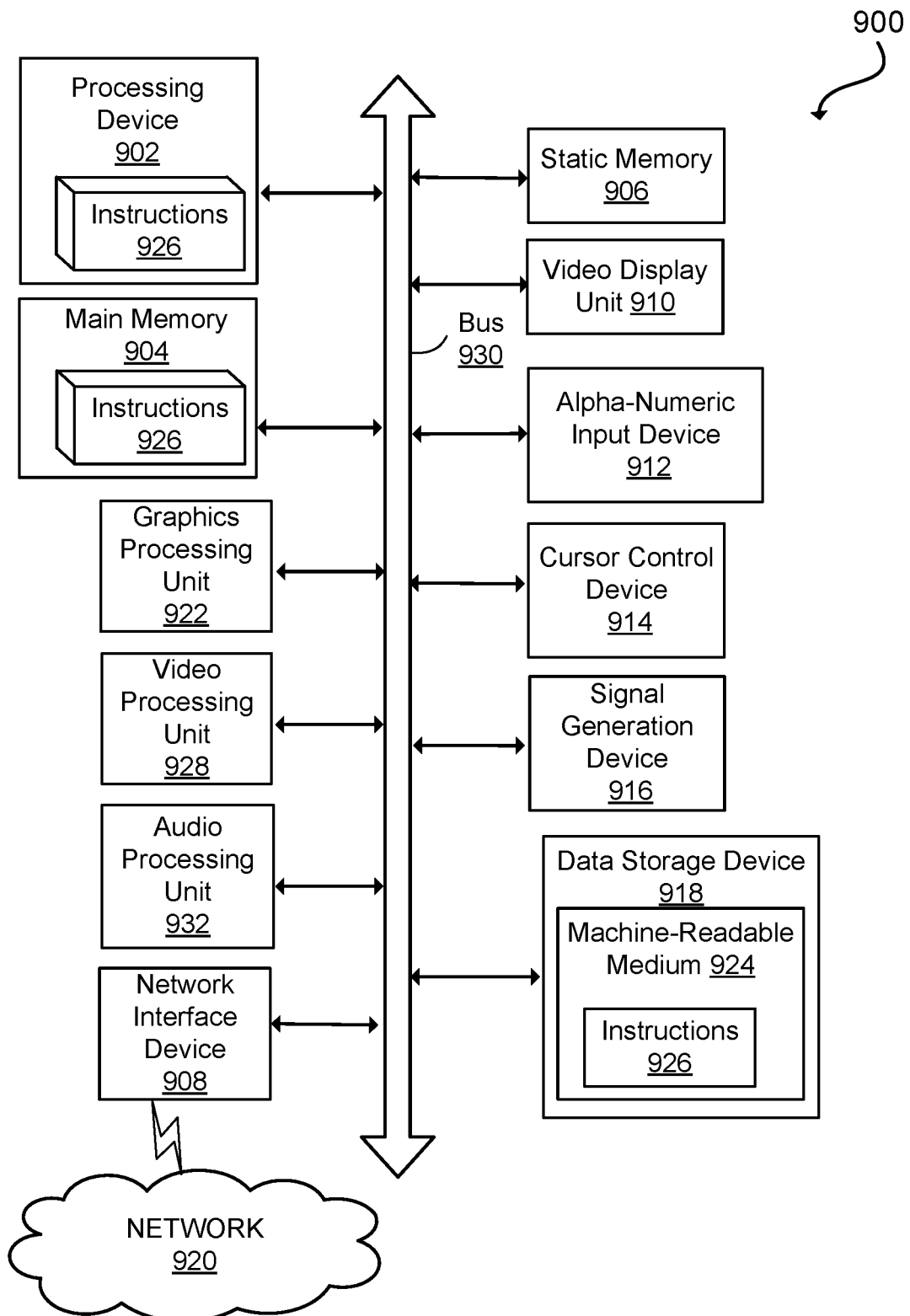
FIG. 9 depicts a diagram of an example computer system in which embodiments of the present disclosure may operate.

FIG. 9 illustrates an example machine of a computer system 900 within which a set of instructions, for causing the machine to perform any one or more of the methodologies discussed herein, may be executed. In alternative implementations, the machine may be connected (e.g., networked) to other machines in a LAN, an intranet, an extranet, and/or the Internet. The machine may operate in the capacity of a server or a client machine in client-server network environment, as a peer machine in a peer-to-peer (or distributed) network environment, or as a server or a client machine in a cloud computing infrastructure or environment.

The machine may be a personal computer (PC), a tablet PC, a set-top box (STB), a Personal Digital Assistant (PDA), a cellular telephone, a web appliance, a server, a network router, a switch or bridge, or any machine capable of executing a set of instructions (sequential or otherwise) that specify actions to be taken by that machine. Further, while a single machine is illustrated, the term "machine" shall also be taken to include any collection of machines that individually or jointly execute a set (or multiple sets) of instructions to perform any one or more of the methodologies discussed herein.

The example computer system 900 includes a processing device 902, a main memory 904 (e.g., read-only memory (ROM), flash memory, dynamic random access memory (DRAM) such as synchronous DRAM (SDRAM), a static memory 906 (e.g., flash memory, static random access memory (SRAM), etc.), and a data storage device 918, which communicate with each other via a bus 930.

Processing device 902 represents one or more processors such as a microprocessor, a central processing unit, or the like. More particularly, the processing device may be complex instruction set computing (CISC) microprocessor, reduced instruction set computing (RISC) microprocessor, very long instruction word (VLIW) microprocessor, or a processor implementing other instruction sets, or processors implementing a combination of instruction sets. Processing device 902 may also be one or more special-purpose processing devices such as an application specific integrated circuit (ASIC), a field programmable gate array (FPGA), a digital signal processor (DSP), network processor, or the like. The processing device 902 may be configured to execute instructions 926 for performing the operations and steps described herein.

The computer system 900 may further include a network interface device 908 to communicate over the network 920. The computer system 900 also may include a video display unit 910 (e.g., a liquid crystal display (LCD) or a cathode ray tube (CRT)), an alphanumeric input device 912 (e.g., a keyboard), a cursor control device 914 (e.g., a mouse), a graphics processing unit 922, a signal generation device 916 (e.g., a speaker), graphics processing unit 922, video processing unit 928, and audio processing unit 932.

The data storage device 918 may include a machine-readable storage medium 924 (also known as a non-transitory computer-readable medium) on which is stored one or more sets of instructions 926 or software embodying any one or more of the methodologies or functions described herein. The instructions 926 may also reside, completely or at least partially, within the main memory 904 and/or within the processing device 902 during execution thereof by the computer system 900, the main memory 904 and the processing device 902 also constituting machine-readable storage media.

In some implementations, the instructions 926 include instructions to implement functionality corresponding to the present disclosure. While the machine-readable storage medium 924 is shown in an example implementation to be a single medium, the term "machine-readable storage medium" should be taken to include a single medium or multiple media (e.g., a centralized or distributed database, and/or associated caches and servers) that store the one or more sets of instructions. The term "machine-readable storage medium" shall also be taken to include any medium that is capable of storing or encoding a set of instructions for execution by the machine and that cause the machine and the processing device 902 to perform any one or more of the methodologies of the present disclosure. The term "machine-readable storage medium" shall accordingly be taken to include, but not be limited to, solid-state memories, optical media, and magnetic media.

Some portions of the preceding detailed descriptions have been presented in terms of algorithms and symbolic representations of operations on data bits within a computer memory. These algorithmic descriptions and representations are the ways used by those skilled in the data processing arts to most effectively convey the substance of their work to others skilled in the art. An algorithm may be a sequence of operations leading to a desired result. The operations are those requiring physical manipulations of physical quantities. Such quantities may take the form of electrical or magnetic signals capable of being stored, combined, compared, and otherwise manipulated. Such signals may be referred to as bits, values, elements, symbols, characters, terms, numbers, or the like.

It should be borne in mind, however, that all of these and similar terms are to be associated with the appropriate physical quantities and are merely convenient labels applied to these quantities. Unless specifically stated otherwise as apparent from the present disclosure, it is appreciated that throughout the description, certain terms refer to the action and processes of a computer system, or similar electronic computing device, that manipulates and transforms data represented as physical (electronic) quantities within the computer system's registers and memories into other data similarly represented as physical quantities within the computer system memories or registers or other such information storage devices.

The present disclosure also relates to an apparatus for performing the operations herein. This apparatus may be specially constructed for the intended purposes, or it may include a computer selectively activated or reconfigured by a computer program stored in the computer. Such a computer program may be stored in a computer readable storage medium, such as, but not limited to, any type of disk including floppy disks, optical disks, CD-ROMs, and magnetic-optical disks, read-only memories (ROMs), random access memories (RAMs), EPROMs, EEPROMs, magnetic or optical cards, or any type of media suitable for storing electronic instructions, each coupled to a computer system bus.

The algorithms and displays presented herein are not inherently related to any particular computer or other apparatus. Various other systems may be used with programs in accordance with the teachings herein, or it may prove convenient to construct a more specialized apparatus to perform the method. In addition, the present disclosure is not described with reference to any particular programming language. It will be appreciated that a variety of programming languages may be used to implement the teachings of the disclosure as described herein.

The present disclosure may be provided as a computer program product, or software, that may include a machine-readable medium having stored thereon instructions, which may be used to program a computer system (or other electronic devices) to perform a process according to the present disclosure. A machine-readable medium includes any mechanism for storing information in a form readable by a machine (e.g., a computer). For example, a machine-readable (e.g., computer-readable) medium includes a machine (e.g., a computer) readable storage medium such as a read only memory ("ROM"), random access memory ("RAM"), magnetic disk storage media, optical storage media, flash memory devices, etc.

In the foregoing disclosure, implementations of the disclosure have been described with reference to specific example implementations thereof. It will be evident that various modifications may be made thereto without departing from the broader spirit and scope of implementations of the disclosure as set forth in the following claims. Where the disclosure refers to some elements in the singular tense, more than one element can be depicted in the figures and like elements are labeled with like numerals. The disclosure and drawings are, accordingly, to be regarded in an illustrative sense rather than a restrictive sense.

The invention claimed is:

1. A method comprising:
applying, by a processor, a reduced clock synthesis process to a logical design of an integrated circuit, thereby generating a proxy clock network for the logical design; wherein the logical design comprises a register transfer level (RTL) description of the integrated circuit; and
estimating, based on the proxy clock network, a power consumption of a fully synthesized clock network for the logical design resulting from an implementation-quality clock synthesis process applied to the logical design; wherein the implementation-quality clock synthesis process operates to meet a complete set of design constraints on the clock network and the reduced clock synthesis process operates to meet a subset of the complete set of design constraints.

2. The method of claim 1 wherein the complete set of design constraints includes optimizing for clock latency, and the reduced set of design constraints includes substantially less optimizing for clock latency.

3. The method of claim 1 wherein the complete set of design constraints includes optimizing for buffer count for the clock network, and the reduced set of design constraints includes substantially less optimizing for buffer count.

4. The method of claim 1 wherein the reduced set of design constraints includes constraints on max-transition, max-capacitance and max-fanout that are substantially the same as in the complete set of design constraints.

5. The method of claim 4 wherein the reduced set of design constraints further includes constraints on non-default rules and layer assignment that are substantially the same as in the complete set of design constraints.

6. The method of claim 1 wherein the complete set of design constraints includes constraints on clock skew, and the reduced set of design constraints includes relaxed constraints on clock slew.

7. The method of claim 1 wherein the proxy clock network has a different topology than the fully synthesized clock network resulting from the implementation-quality clock synthesis process.

8. The method of claim 1 wherein the proxy clock network comprises cells that are placed but not physically routed.

\* \* \* \* \*